D. WILLIAMS.
Press Dyeing.
No. 4,416. Patented March 14, 1846.
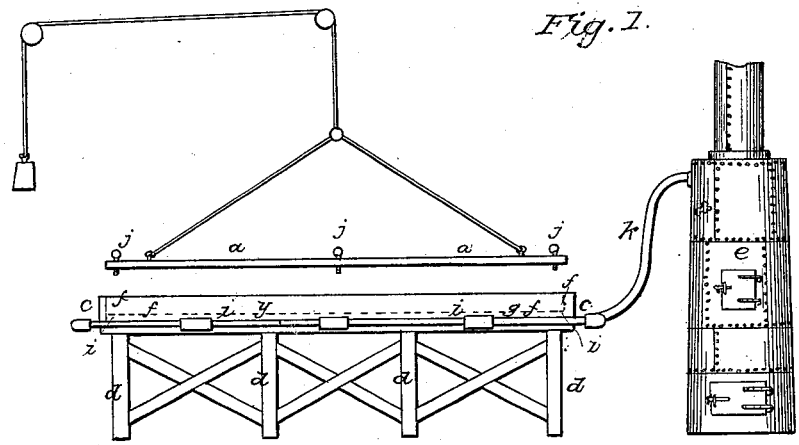
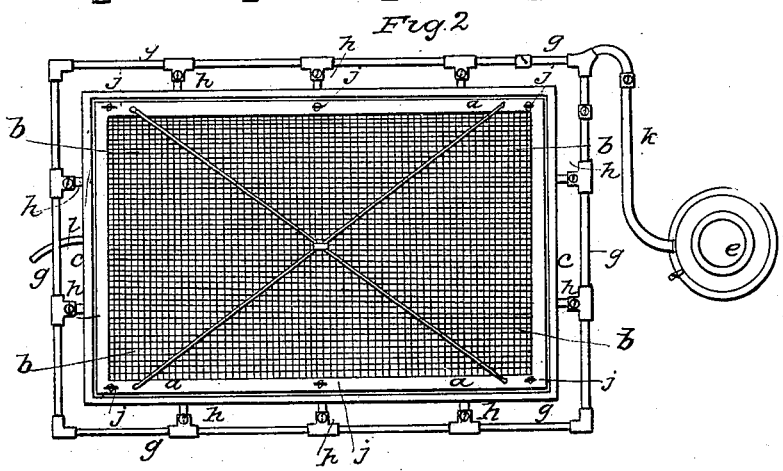

UNITED STATES PATENT OFFICE.

DENISON WILLIAMS, OF ALBANY, NEW YORK.

DYEING HAIR, WOOL, &c.

Specification of Letters Patent No. 4,416, dated March 14, 1846.

*To all whom it may concern:*

Be it known that I, DENISON WILLIAMS, of Albany, in the county of Albany and State of New York, have invented a new and Improved Mode of Dyeing Furs, Wool, and Hair-Skins; and I do hereby declare that the following is a full, clear, and exact description of the same, reference being to the accompanying drawings, making part of this specification.

The nature of my invention consists in spreading the skin to be colored, with the hair side downward, upon a netting formed by stretching wires across a horizontal frame, and sinking the frame into vat filled with hot dye, until the hair is immersed to such depth as the color is intended to penetrate; the netting of wire serving to defend the skin from injury from the heated liquor.

Figure 1 represents an elevation and Fig. 2 a birdseye view of the apparatus which I employ.

The same letters refer to the same parts in both figures.

$a\ a\ a\ a$ is a stout frame either of iron, or of wood strengthened with iron, in which the netting of wire $b\ b\ b\ b$ is stretched.

$c\ c$ is the vat supported upon the frame work $d\ d\ d\ d$ and composed of an iron or copper pan to receive the dye, and a steam jacket which surrounds the pan, and which receiving steam from a generator $e$, serves to keep the dye at the proper temperature. The dotted lines at $f\ f\ f\ f$ in Fig. 1 represent the shallow pan which is let down into a tank or cistern of wood and its lip or edge secured thereto entirely around the joint being made steam tight. The pan being shallower than the cistern and having also sides inclined inward, a space or vacuity $l\ l$ is left into which steam is admitted from the generator by the pipes $g\ g\ g\ g$, and the stop cocks $h\ h$ &c. The frame $a\ a\ a\ a$ is suspended above the vat by cords passing over pulleys depending from the ceiling above and having counter weights at the ends. It is somewhat smaller than the vat, so that it may be sunk therein, the depth to which it shall descend being regulated by the thumbscrews $j\ j\ j\ j$ &c. $k$ is the pipe which brings steam from the generator and $l$ is the pipe which carries off the water of condensation.

The operation is as follows. The skin to be dyed, having been scoured and prepared in the usual manner is spread with the fur side downward, upon the netting of the frame $a\ a\ a\ a$ and rubbed to bring the skin in contact with the wires and cause the hair or fur to project below. The vat is prepared by filling the pan with hot dye and admitting the steam into the jacket $i\ i\ i\ i$ keeping the liquor at the temperature of about 150° Fahrenheit. The frame is now sunk in the vat until the hairs of the fur to be colored are immersed to the depth to which the color is intended to penetrate, the netting keeping the skin out of danger from the hot dye. The frame is occasionally raised to allow the air to act upon the fur, which facilitates the operation. Small, delicate and short furred skins I attach to the under side of the netting. This I generally do, by laying a piece of stout paper, the under side of which is smeared with paste, upon the upper side of the netting and pressing it so as to bring the paste in contact with the back of the skin through the meshes of the netting. I sometimes also dispense with netting and stretch the skins within the frame, attaching them by the edges, thereto. I also sometimes attach the skins to flat surfaces of boards or other materials, operating in the same manner as when the frame is used, but I prefer the netting of wire &c., as above described.

What I claim as my invention and desire to secure by Letters Patent is—

The mode of dyeing or coloring furs wool and hair skins herein described and set forth, viz. By stretching them upon horizontal nettings, frames, or smooth surfaces of any suitable material and in this condition immersing the hair of the skins in dyes either warm or cold; the object being to protect the skin from damage while the fur is acquiring the desired color.

DENISON WILLIAMS.

Witnesses:
WM. S. ELLISON,
CHAS. H. HAZEN.